UNITED STATES PATENT OFFICE

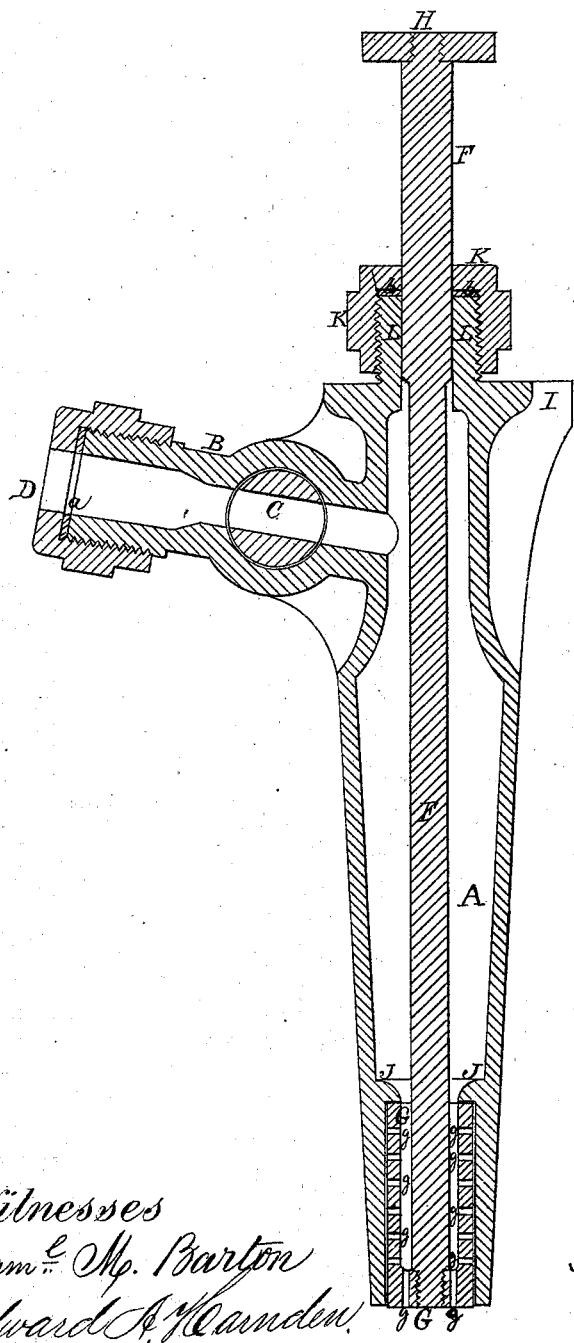

SAMUEL R. THOMPSON, OF PORTSMOUTH, NEW HAMPSHIRE.

IMPROVEMENT IN FAUCETS.

Specification forming part of Letters Patent No. 144,422, dated November 11, 1873; application filed August 25, 1873.

*To all whom it may concern:*

Be it known that I, SAMUEL R. THOMPSON, of Portsmouth, in the county of Rockingham and State of New Hampshire, have invented certain Improvements in Faucets, of which the following is a specification:

The accompanying drawing represents a central longitudinal section of my improved faucet.

The present invention relates to certain new and useful improvements in faucets, and is applicable more particularly to that class of faucets used in beer-barrels.

The object of my invention is to prevent the flying out and waste of the beer when the faucet is driven into the barrel. My improvements consist mainly in a perforated plunger on the end of a rod arranged to operate back and forth longitudinally within a faucet-stem, so that when the faucet-stem is securely driven into the faucet-hole, the plug not being driven clear of the barrel, the plunger is shoved in and forces the plug into the barrel, and admits the beer or other contents of the barrel into the faucet, strained of the hops, &c., without allowing any escape and waste of the beer, all of which I will now proceed to more particularly describe.

In the drawing, A represents the stem of a faucet, provided with a side pipe, B, and cock C, said pipe B having a screw end to receive a screw-cap, D, supplied with suitable packing, *a*, and arranged to receive a pump-pipe. Extending longitudinally within the faucet is a rod, F, having at one end a plunger, G, formed with perforations *g*, extending through its circumference and bottom. This plunger G is hollow, and is attached to the rod F, by which it is shoved out beyond the mouth of the faucet, or drawn within the faucet, so as to abut against an annular shoulder, J, projecting from the interior periphery of the faucet. The other end of the rod F is formed with a cap, H, for the purpose of shoving it in or withdrawing it. The outer end of the faucet is formed with a flange, I, to receive the blows of the implement used in driving the faucet in the barrel, said flange tapering on the side downward and inward to join the outer periphery of the faucet-stem A; or the faucet may be otherwise arranged to be driven into the barrel. Above the flange I the faucet is formed with a screw-stem, L, to receive a screw-cap, K, provided with suitable packing, *b*.

Heretofore, in driving the faucet into the barrel, the plug was liable to be forced in before the faucet was tightly secured in the barrel, thus allowing the escape and waste of the beer or other contents of the barrel, and frequently drenching with beer, &c., the person applying the faucet.

In my improvements these objections are obviated as follows: When the faucet, whose diameter at the mouth is of a size sufficient to fill the hole of the barrel without driving the plug clear in, is driven into the hole, the perforated plunger G is pushed out beyond the mouth of the faucet, thus driving in the plug and receiving the beer, strained of its hops, &c., through the perforations *g*. The faucet already filling the hole before the plug is driven out prevents the escape of the beer, as will readily be seen. When the faucet is removed from the barrel, the plunger G is readily drawn by the rod F within the faucet against the shoulder or collar J.

Having thus fully described my improvements, what I claim as my invention, and desire to have secured to me by Letters Patent, is—

The perforated plunger G, attached to rod F, in combination with a faucet, substantially as and for the purposes set forth.

In testimony whereof I have signed my name to this specification in the presence of two subscribing witnesses.

SAMUEL R. THOMPSON.

Witnesses:
SAMUEL M. BARTON,
CARROLL D. WRIGHT.